United States Patent [19]
Sewell

[11] Patent Number: 5,235,330
[45] Date of Patent: Aug. 10, 1993

[54] DIGITAL REBALANCE LOOP
[75] Inventor: Wesley C. Sewell, Dunedin, Fla.
[73] Assignee: Honeywell Inc., Minneapolis, Minn.
[21] Appl. No.: 873,643
[22] Filed: Jun. 12, 1986
[51] Int. Cl.$^5$ .............................................. G01C 21/00
[52] U.S. Cl. ................................... 340/967; 364/453; 364/436; 73/178 R
[58] Field of Search ............... 340/364, 347 AD; 73/178 R, 497, 517 B, 516 R; 318/648, 601; 364/453, 436

[56] References Cited
U.S. PATENT DOCUMENTS

| | | | |
|---|---|---|---|
| 3,459,053 | 8/1969 | Grimme et al. | 73/517 |
| 3,470,747 | 10/1969 | Rasmussen | 73/517 |
| 3,508,254 | 4/1970 | Ross et al. | 340/347 |
| 3,782,205 | 1/1974 | Fletcher et al. | 73/497 |
| 3,877,020 | 4/1975 | Brunsting et al. | 340/347 AD |
| 3,877,313 | 4/1975 | Ferriss | 73/516 R |
| 4,200,925 | 4/1980 | Cushman | 364/453 |
| 4,282,470 | 8/1981 | Reynolds | 318/648 |
| 4,371,921 | 2/1983 | Cushman | 364/453 |
| 4,507,737 | 3/1985 | LaSarge et al. | 364/453 |

Primary Examiner—Mark Hellner
Attorney, Agent, or Firm—Ronald E. Champion

[57] ABSTRACT

A digital rebalance system for an inertial reference sensor. The rebalance system associates the error signal output with a sample value of a stored error signal and generates a rebalancing torquing pattern waveform in response to the error signal. The system includes waveform generation and error signal processing devices, precision timing devices, passive compensation circuitry and a precision switching circuit.

14 Claims, 5 Drawing Sheets

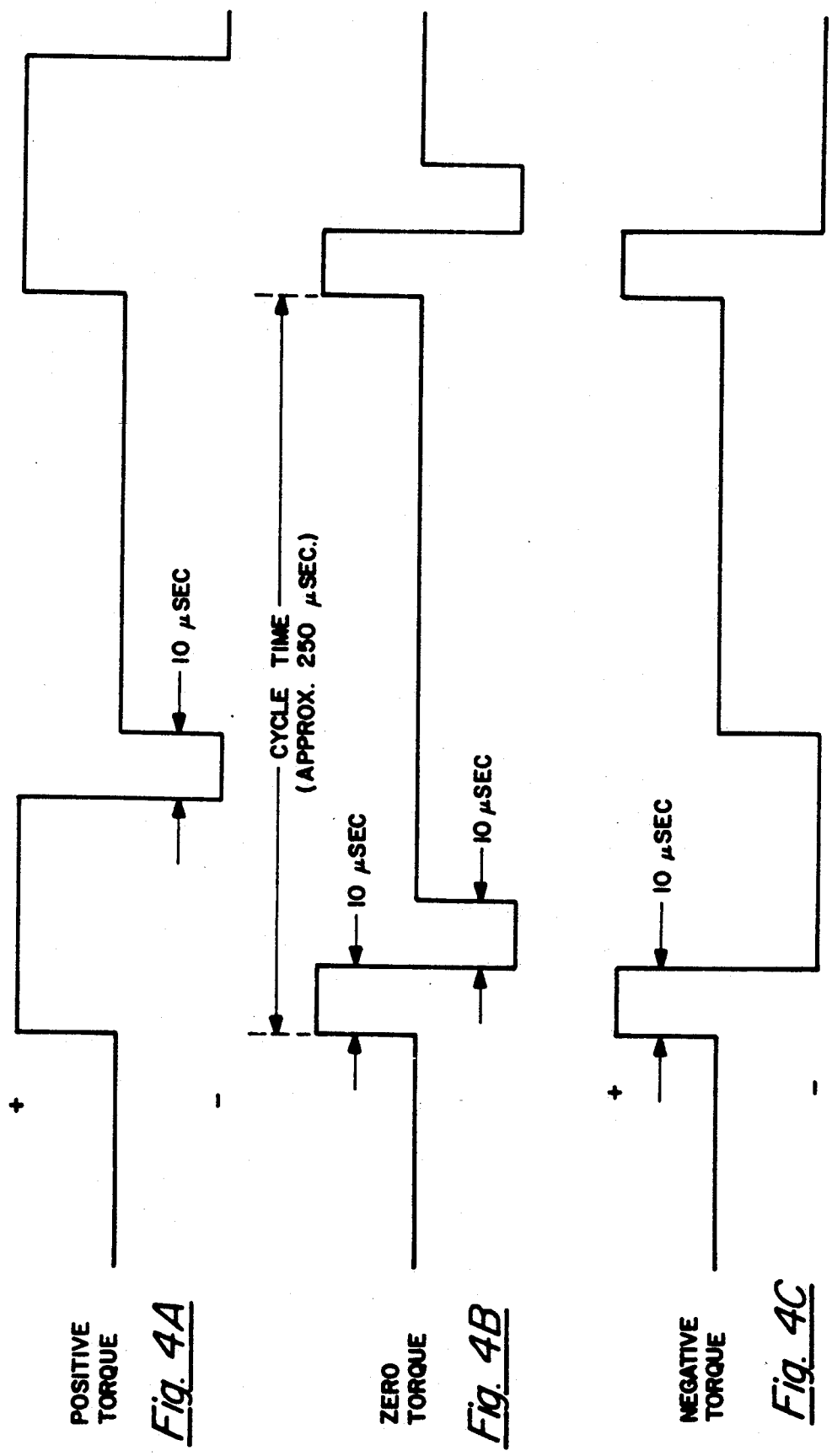

DIGITAL REBALANCE LOOP

BACKGROUND OF THE INVENTION

1. Field of the Invention

This invention relates generally to digital rebalance loops and more particularly to a high resolution, radiation-hardened digital rebalance loop for gas damped accelerometers wherein the digital rebalance loop is radiation hardened.

2. Discussion of the Prior Art

Low cost accelerometers used with laser-gyrobased systems for aircraft navigation and tactical missile applications have traditionally used an integral, vendor-supplied analog rebalance loop with an external digitizer. The existing implementations of both the analog loop and the digitizer have recognized problems in a nuclear radiation environment due to bias shifts in analog devices. Most current military applications require some level of radiation hardening.

One example of a rebalancing circuit is disclosed in U.S. Pat. No. 3,877,020 to Brunsting. Brunsting discloses an integrator type voltage to frequency converting circuit including a switchable current rebalancing source for rebalancing the input to the integrator. The rebalancing current source is controlled to provide paired transition rebalancing pulses for linear and symmetrical operation of the converter. Brunsting teaches that the rebalancing pulse must have a net polarity with the intervals of switch on being of sufficient duration to permit build up of a current to a given amplitude and the intervals of switch off being of sufficient duration to permit complete decay of the prior current. The loop is rebalanced by introducing a number of pulses directly proportional to the input analog signal applied to the integrator circuit. These pulses are applied to the integrator input of the circuit and not the torquing coil of the accelerometer itself.

SUMMARY OF THE INVENTION

A digital rebalance system for an inertial reference sensor is disclosed. The sensor includes an analog error signal output and a torquer coil. The rebalance system associates the error signal output with a stored sample value error signal and its corresponding rebalancing torquing pattern data. The rebalance system subsequently generates a rebalancing torquing pattern to rebalance the intertial reference sensor. The rebalance circuit includes a memory for storing sample values of error signals and corresponding rebalancing torquing patterns. Also included are means for integrating and shaping the error signal from the sensor. The invention further comprises means for converting the analog output of the integrating means into a digital error signal, the conversion means being connected to the output of the integrating means. A buffer, having output and input ports, for holding torque pattern data is also provided. Means for processing digital error signals are connected to the buffer input ports, the processing means include mean for associating the digital error signal of the current torquing cycle with a stored sample value of an error signal and its corresponding rebalancing torquing pattern data and further includes means for supplying the corresponding rebalancing torquing pattern data to the buffer. Means for generating torquing pattern waveforms is connected to the output port of the buffer wherein the generated waveforms during a torquing cycle are derived from the corresponding rebalancing torquing pattern data associated with the digital error signal processed during the previous torquing cycle. A precision current switch is connected to the sensor torquer coil for switching torque control line current into the torquer coil. Steering logic means are connected between the input of the precision current switch and the output of the generating means for decoding the output of the generating means into positive and negative torque control lines for the precision current switching means. Passive compensation means are connected from the sensor error signal output to the torquer coil for stabilizing the rebalance loop.

One object of the invention is to provide a high resolution, pulse-width-modulated digital rebalance loop operating with gas-damped, quartz-flexure sensors.

A further object of the invention is to provide a high resolution, pulse-width modulated digital rebalance loop which provides linear increments of rebalancing current over an entire torque cycle period.

These and other objects, features, and advantages of the invention will become apparent upon reading the following specification together with the accompanying drawings.

BRIEF DESCRIPTION OF THE DRAWINGS

FIGS. 4a–4c shows some typical sample digital torquing patterns.

DESCRIPTION OF THE PREFERRED EMBODIMENT

Figure 1:
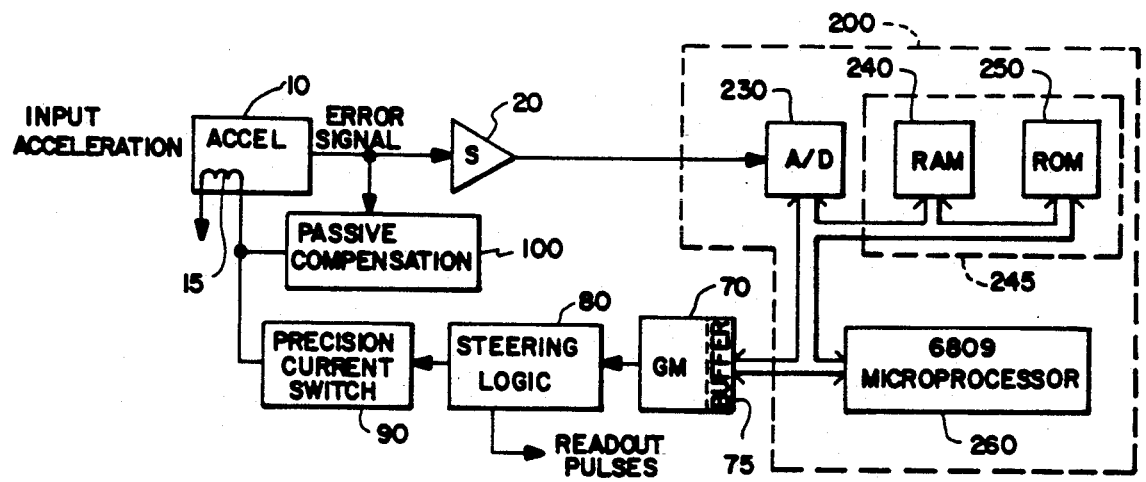
FIG. 1 is a schematic of a digital rebalance loop system for gas damped accelerometers.

Referring now to FIG. 1, there is an accelerometer 10 which outputs an error signal to a passive compensation circuit 100 and an integrator circuit 20. In one embodiment of the invention a JAE model JA-5 gas-damped accelerometer was used for accelerometer 10. Other suitable accelerometers include the Sundstrad Q-FLEX gas damped accelerometer. The output of integrator circuit 20 is applied to the wave form processor 200 which includes means for processing the error signal 260, and memory 245 for storing operating software, a plurality of sample values of error signals and corresponding rebalancing torquing pattern data. The waveform processor 200 and its operation are discussed in detail below.

During a given torquing cycle, the waveform processor 200 applies torquing pattern data in response to an error signal to a means for generating torquing pattern waveforms 70. The generating means 70 preferably includes an input buffer 75 for holding torquing pattern data of one waveform while generating means 70 is executing the pattern data stored in the buffer 75 during the previous torquing cycle. In one embodiment of the invention, the generating means 70 comprised a 6840 precision timing module as manufactured by Motorola Semiconductor Products Inc. of Austin, Tex. The generator means 70 applies the torquing pattern waveform generated to the steering logic 80. The steering logic 80 is connected to the output of the generating means 70 and to the input of a precision current switch 90. The steering logic 80 decodes the output of the generating means 70 into positive and negative torque control line currents which are applied to the precision current switch 90. The precision current switch 90 is, in turn, connected to the torquer coil 15 and switches torque control line current into the torquer coil 15. Passive compensation means 100 is connected between the sensor error signal output and the torquer coil 15 and serves to stabilize the rebalance loop.

Still referring to FIG. 1, the waveform processor 200 includes an analog-to-digital converter 230 for converting the accelerometer error signal, which is in analog form as it emanates from the integrator 20, into a digital error signal. The digital error signal is then further processed by the processing means 200. The processing means 200 may advantageously be comprised of a microprocessor 260, Read Only Memory (ROM) 250, and Random Access Memory (RAM) 240. The RAM 240 and ROM 250 memories are used with the microprocessor for storage of temporary variables, sample values of digital error signals and corresponding rebalancing torquing pattern data and the operating software In one embodiment of the invention, a 6809 microprocessor manufactured by Motorola Semiconductor Products Inc. of Austin, Tex. was used in the waveform processor 200. In one embodiment of the invention, the look-up table for the sample values of the digital error signal and corresponding rebalancing torquing patterns was generated from the following software program:

Program to Generate Look-Up Table

10 POKE 150,41
20 PRINT #-2,"A/D VOLTS", "HEX VAL", "DEC ERR", "POS CNT", "NEG CNT"
30 DC=511
100 PC=10
110 NC=10
130 ER=DC-256
135 VL=5*ER/256
150 IF ER>0 GOTO 175
160 IF ER<0 GOTO 185
175 PC=PC+ER:GOTO 200
185 NC=NC-ER
200 IF PC 230 GOTO 210
205 PC=230:GOTO 300
210 IF NC<230 GOTO 300
215 NC=230
300 PRINT#-2,VL,HEX$(DC),ER,PC,NC
310 DC=DC-1
320 IF DC>0 GOTO 100

The sample digital errors stored ranged from about a positive 5 volts to about a negative 5 volts. The range was divided into 510 uniform increments so that, for example, positive 5 volts represented a decimal error of 255 and a negative 5 volts represented a decimal error of −255. A digital error of 0 volts represented a decimal error of 0 and so on. The values computed for the positive (Positive Count) and negative (Negative Count) components of the rebalancing torquing pattern waveform corresponding to the digital error signals were also computed by the above software program and stored in RAM and ROM memories. By way of example, a portion of the look-up table used in one embodiment of the invention is shown below:

TABLE 1

| Digital Error in Volts | Partial Look-Up Table for Digital Rebalancing Accelerometer Loop | | | |
|---|---|---|---|---|
| | HEX VALUE | Decimal Error | Positive Count | Negative Count |
| .09765625 | 105 | 5 | 15 | 10 |
| .078125 | 104 | 4 | 14 | 10 |
| .05859375 | 103 | 3 | 13 | 10 |
| .0390625 | 102 | 2 | 12 | 10 |
| .01953125 | 101 | 1 | 11 | 10 |
| 0 | 100 | 0 | 10 | 10 |
| −.91953125 | FF | −1 | 10 | 11 |
| −.0390625 | FE | −2 | 10 | 12 |
| −.05859375 | FD | −3 | 10 | 13 |
| −.078125 | FC | −4 | 10 | 14 |
| −.09765625 | FB | −5 | 10 | 15 |

The processor 200 reads a digital error signal and associates it with a stored sample error signal and its corresponding rebalancing torquing pattern data as found, for example, in Table 1. The processor 200 then supplies the pattern data to the generating means 70 for generating the torquing pattern waveforms necessary for rebalancing the accelerometer loop. In one embodiment of the invention, the positive and negative counts were translated by generating means 70 into time periods wherein each count was given a value of one microsecond.

Figure 2:
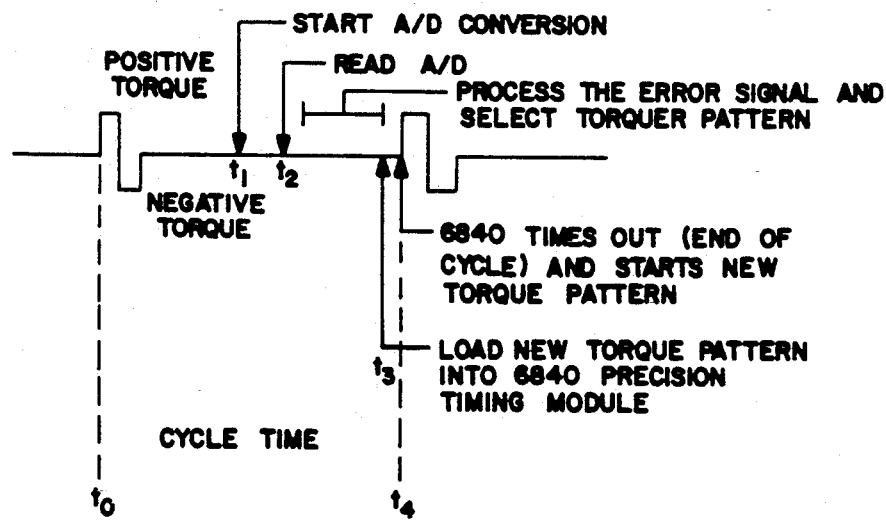
FIG. 2 is a timing diagram showing the timing relationships between the operations of the digital rebalance loop during a torquing cycle.

Referring now to FIG. 2, a timing diagram of the processing sequence is shown As a torquing cycle begins at time $t_0$, the positive torque and negative torque are initiated at the output of the generating means 70. At about the midpoint of the torquing cycle, time $t_1$, the analog-to-digital conversion of the error signal supplied by the integrator is completed. At time $t_2$ the digital error signal is read by the processor 200. The processor 200 then compares the digital error signal with the stored sample error signals in memory 240 and selects a sample error with a value that most closely matches the digital error signal. The processor 200 then outputs the positive count and negative count information which constitutes the torquing pattern data responsive to the digital error signal and outputs that torquing pattern data to generating means 70. Generating means 70 stores the torquing pattern data in buffer 75 until the current torquing cycle ends. Upon initiation of the next successive torquing cycle, the generating means 70 generates a rebalancing waveform derived from the torquing pattern data from buffer 75 and applies the rebalancing waveform to the steering logic 80. The steering logic means 80, in turn, decodes the rebalancing waveform into positive and negative torque control line currents (called steering commands) for the precision current switch 90. The precision current switch 90 then applies current appropriately to the torquing coil 15 of the accelerometer 10 in response to the steering commands from the steering logic 70.

Figure 7:
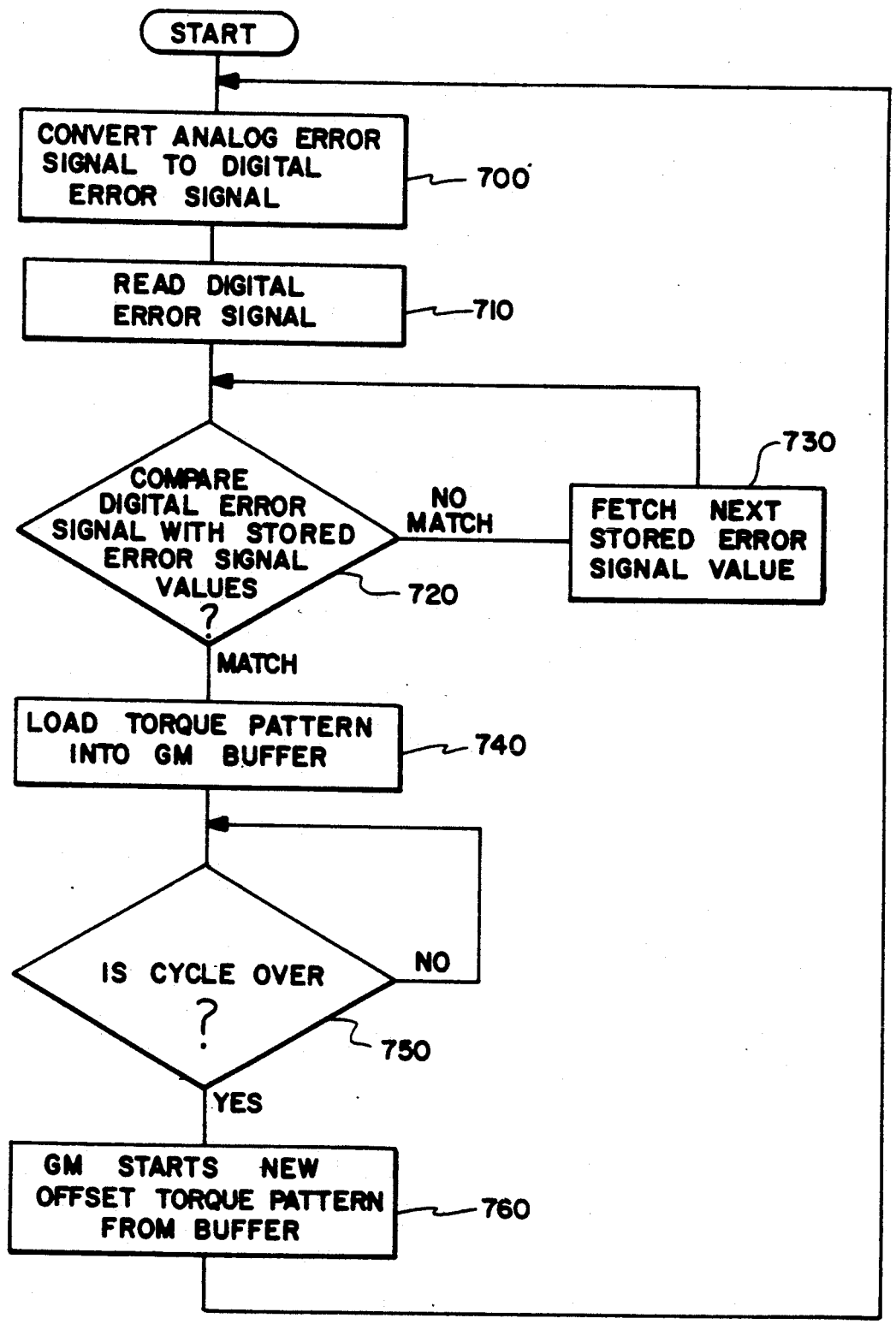
FIG. 7 is a flow chart of the novel portion of the operation of the system of FIG. 1.

Referring now to FIG. 7, a generalized flow chart of the processing done by the waveform processor 200 is shown. At 700 the analog error signal is converted to a digital error signal. At 710 the waveform processor 200 reads the digital error signal. At 720 the waveform processor 200 compares the digital error signal with a stored error signal value from an addressable memory location in ROM 250. If the digital error signal does not match with the sample error signal value from memory, the waveform processor proceeds to step 730 where it fetches the next stored error signal value from the table and again makes a comparison with the next value at step 720. This cycle is repeated until a match is found within a range of allowable error. Once a match has been found, the processor loads the torquing pattern data corresponding to the matching error signal value into the precision timing module buffer 75. At 750 the waveform processor waits until the current torquing cycle times out before proceeding to 760 where the precision timing module generates a torquing pattern in response to the torquing pattern data loaded into the buffer 75 in the previous torquing cycle. The process then returns to 700 to process the next analog error signal from the accelerometer.

Figure 3:
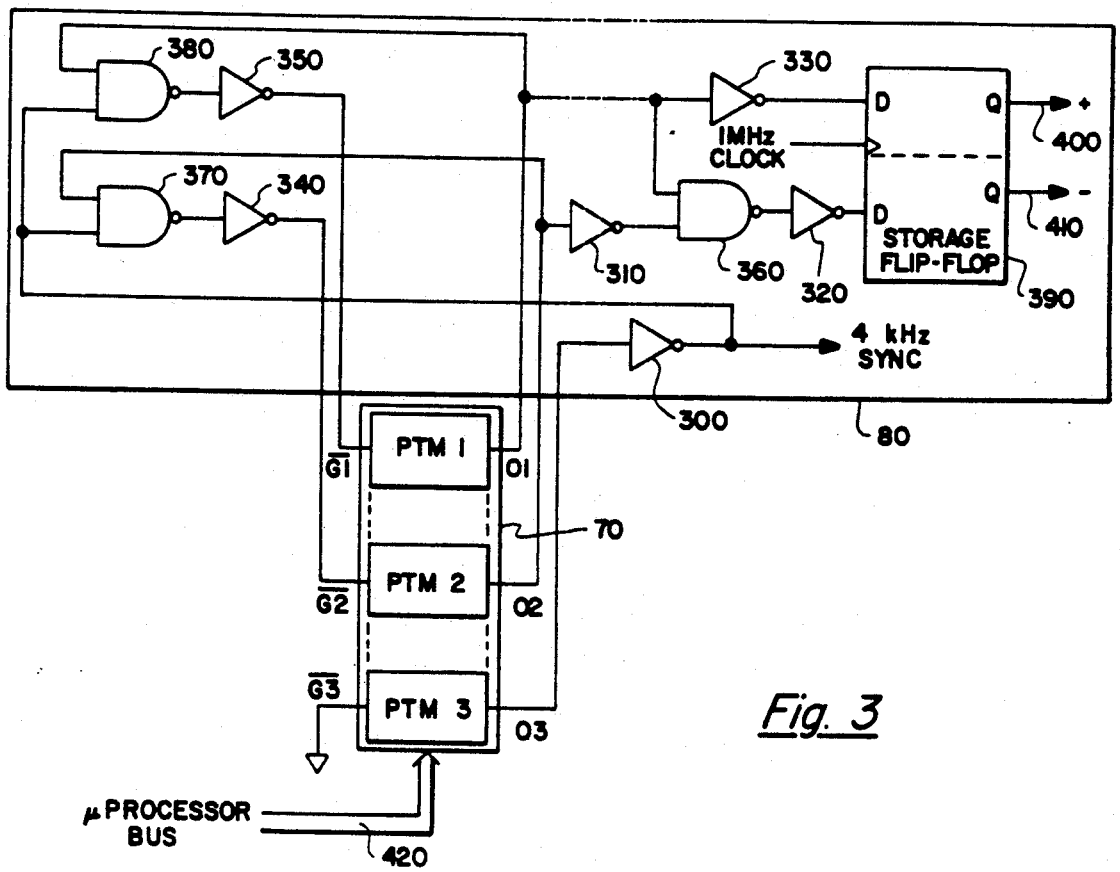
FIG. 3 is a more detailed schematic circuit diagram of the steering logic and generating means.

Referring now to FIG. 3, a more detailed schematic is shown of one embodiment of the generating means 70 and steering logic 80. In the embodiment shown in FIG. 3, a 6840 precision timing module was used for the generating means 70. The 6840 precision timing module comprises 3 separate precision timing modules PTM1, PTM2, and PTM3 having associated with them gating inputs $\overline{G1}$, and $\overline{G2}$, and $\overline{G3}$ and outputs 01, 02, and 03. In this embodiment, the steering logic means 80 comprised inverters 300, 310, 320, 330, 340, and 350; NAND gates 360, 370, and 380; and storage flip-flop 390. Inverter 300 was connected at its input to node 03 and at its output to a 4 KHz sync pulse, to a first input of NAND gate 370 and a first input of NAND gate 380. Inverter 310 was connected at its input to node 02 and at its output to a first input of NAND gate 360. NAND gate 360 was connected at a second input to node 01 and at its output to the input of inverter 320. Inverter 320 was connected at its output to a first D input of storage flip-flop 390. Inverter 330 was connected at its input to node 01 and at its output to a second D input of storage flip-flop 390. Also connected to node 01 was a second input of NAND gate 380 The output of NAND gate 380 was connected to the input of inverter 350 which, in turn, was connected at its output to node $\overline{G1}$ NAND gate 370 was connected at a second input to node 02 and at the output to the input of inverter 340. Inverter 340 was connected at its output to node $\overline{G2}$. The rebalancing torquing pattern data including positive count and negative count data was loaded into the precision timing module 70 from the microprocessor bus 420. PTM3 counted the cycle rate and timed out the torquing cycle. PTM1 and PTM2 generated the rebalancing waveform which was then decoded by the steering logic 80. The steering logic 80 then output steering commands at outputs 400 and 410 to the precision current switch 90. In one embodiment of the invention, the current switch was scaled for 20 g's maximum rebalance capability.

It can be seen from FIG. 4 that the digital torquing patterns generated for rebalancing the loop during a cycle time of advantageously, approximately 250 microseconds are comprised of positive and negative pulses incremented in one microsecond steps. As shown in FIG. 4A, as more positive torquing is required, the positive pulse will be incremented in one microsecond steps and the negative pulse will be pushed out into the cycle, still keeping its 10 microsecond width, which is approximately equal to 10 percent negative torque. Conversely, as negative torque is required, the positive pulse will stay at 10 microseconds or approximately 10 percent positive torque, and the negative pulse will be incremented in one microsecond steps. As shown in FIG. 4B, at 0 torque, the torque pulses are not cut to 0 because the torque generator and switching circuitry require a finite time to settle to the point where the energy in additional pulse width increments will be constant or linear over the entire cycle period. It can be appreciated that the 10 percent torque pulse width at 0 torque was selected as a compromise between the torque generator settling time and allowable pendulum motion of the accelerometer. This settling period can be better appreciated in view of the following derivation which show that minimum pulse widths should be equal to 14 time constants to give linearity errors of 1 part per million.

$I = $ Torquing Current $N = $ No. of Time Constants (Time)

Figure 6:
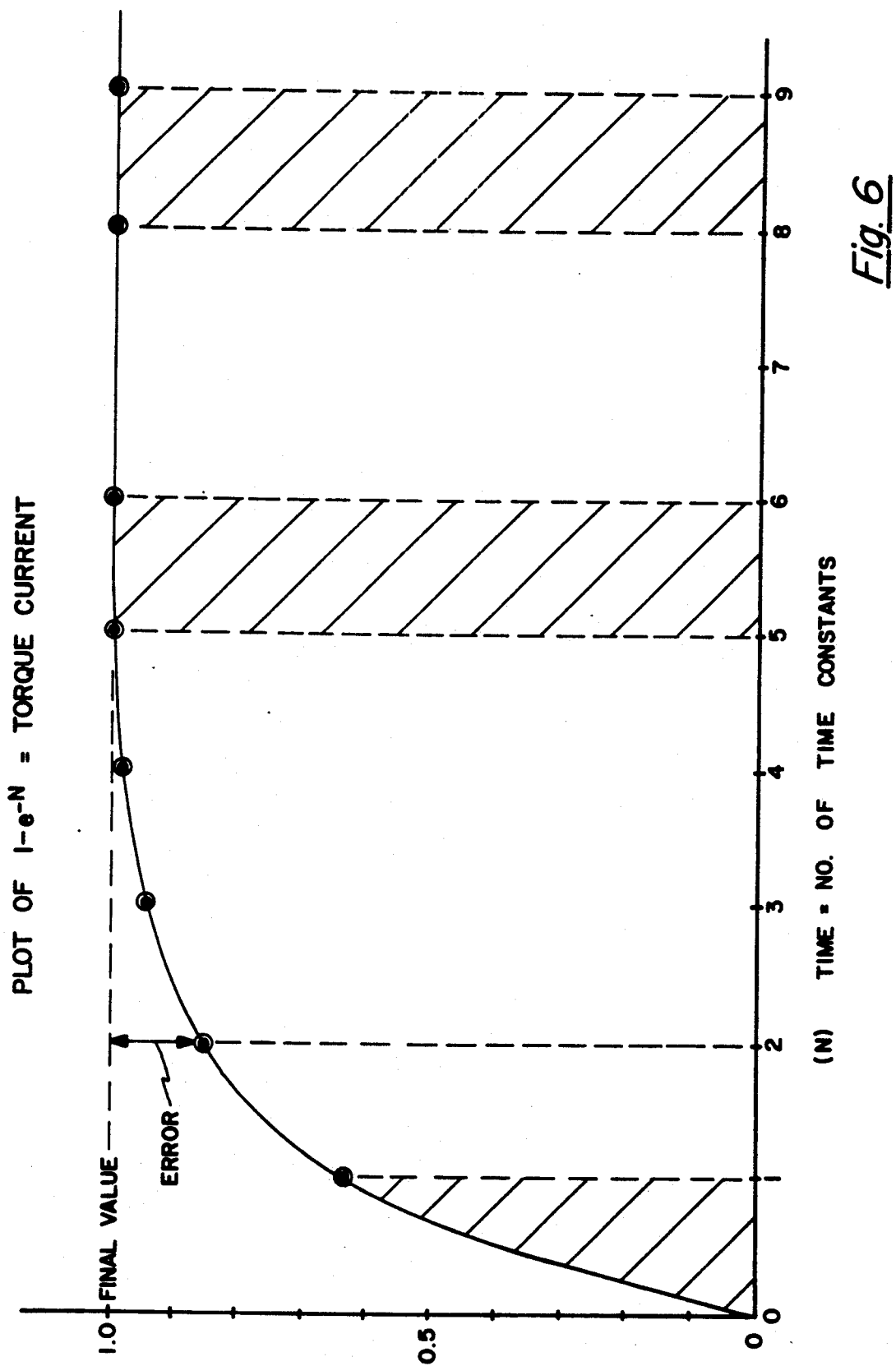
FIG. 6 is a graph showing the relationship of the leading edge of the torquing current pulse to various time constants.

$Tc = $ Time Constant of Current Rise $I = 1 - e^{-N}$ $\int (1 - e^{-N}) dN = N + e^{-N}$ For interval $N = 0-1$ $\int_0^1 (1 - e^{-N}) dN = (1 + e^{-1}) - (0 + e^0) = .37$ Error $= 1 - .37 = .63$ For interval $N = 5-6$ $\int_5^6 (1 - e^{-N}) dN = (6 + e^{-6}) - (5 + e^{-5}) = .995740805$ Error $= 1 - .995740805 = 4.259 \times 10^{-3}$ For interval $N = 13-14$ $\int_{13}^{14} (1 - e^{-N}) dN = (14 + e^{-14}) - (13 + e^{-13}) + .999998571$ Error $= 1 - .999998571 = 1.429 \times 10^{-6}$ For $N = \infty$ $\int_\infty^\infty (1 - e^{-N}) dN - (\infty + e^{-\infty}) -$ $(\infty - 1 + e^{-\infty - 1}) = 1.00000$ Referring now to FIG. 6, a graph of the torquing current is shown. The calculations above show how the current integral reaches within one part per million of its final value at about 14 time constants. FIG. 6 shows a plot of current equal to $1-e^{-N}$. This represents the leading edge of the torquing current pulse. At $N=1$, the integral of the current is only about 36 percent of the integral of period $N=5$ to $N=6$, while the integral of period $N=8$ to $N=9$ is almost the same as for period $N=5$ to $N=6$.

Figure 5:
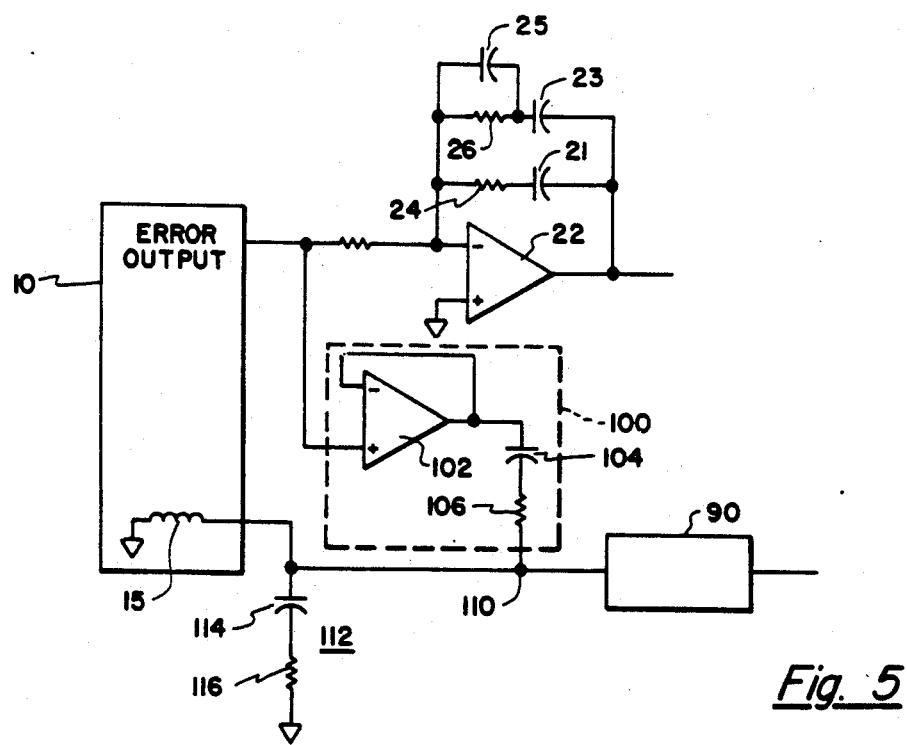
FIG. 5 is a more detailed circuit schematic of the integration and shaping stage and the feed forward compensation of the rebalancing circuit.

Referring now to FIG. 5, a more detailed circuit schematic of one embodiment of the integrating and shaping stage 20, the passive compensation 100 and the connections from the precision current switch 90 to the torquing coil 15 is shown. The integration and shaping stage 20 comprises an operational amplifier 22 having inverting and non-inverting inputs and an output. Connected with the operational amplifier 22 are resistors 24 and 26 and capacitors 21, 23, and 25 in a pattern suitable to form a integration and shaping circuit. The passive compensation means 100 comprises operational amplifier 102, capacitor 104, and resistor 106 connected in a pattern suitable to supply feed forward compensation to the circuit Operational amplifier 102 has a non-inverting input connected to the error output of the accelerometer 10, an inverting input connected to its own output which is also connected to a first terminal of capacitor 104 A second terminal of capacitor 104 is connected to a first terminal of resistor 106 which is connected at a second terminal to the output of the precision current switch at node 110. Also connected at node 110 are the torquing coil 15, and the torquer tuning network 112. The torquer tuning network 112 advantageously comprises a capacitor 114 in series with resistor 116.

While there has been shown and described a preferred embodiment of the invention, those skilled in the art will appreciate that various changes an modifications may be made to the illustrated embodiment without departing from the true spirit and scope of the invention which is to be determined from the appended claims.

The embodiments of the invention in which an exclusive property or right is claimed are defined as follows:

1. A digital rebalance system for an inertial reference sensor having an analog error signal output, and further having a torquer coil wherein the rebalance circuit matches the error signal output with a stored sample value of an error signal and its corresponding rebalancing torquing pattern data, and subsequently generates a rebalancing waveform to rebalance the inertial reference sensor comprising:

memory for storing sample values of error signals and their corresponding rebalancing torquing pattern data;
   means for integrating and shaping the error signal from the sensor;
   means for converting the analog output of the integrating means into a digital error signal, the conversion means being connected to the output of the integrating means;
   a buffer, having output and input ports, for holding torquing pattern data;
   means for processing digital error signals connected to the buffer input ports and including means for matching the digital error signal of the current torquing cycle with a stored sample value of an error signal and its corresponding rebalancing torquing pattern data, and further including means for supplying the corresponding rebalancing torquing pattern data to the buffer;
   means for generating rebalancing waveforms connected to the output ports of the buffer wherein the generated waveforms during a torquing cycle are derived from the corresponding rebalancing torquing pattern data associated with the digital error signal processed during the previous torquing cycle;
   a precision current switch connected to the sensor torquer coil;
   steering logic means connected between the input of the precision current switch and the output of the generating means for decoding the output of the generating means into positive and negative torque control lines for the precision current switch; and
   passive compensation means connected between the sensor error signal output to the torquer coil for stabilizing the rebalance loop.

2. The system of claim 1 wherein the precision current switch is scaled for 20 g's maximum rebalance capability.

3. The system of claim 2 wherein the processing means comprises a microprocessor; a Read Only Memory circuit; and a Random Access Memory circuit.

4. The system of claim 3 wherein the rebalancing torquing pattern data comprises an array of rebalancing torquing patterns including a null torquing pattern corresponding to null error signal which comprises a square wave having a positive pulse of at least about 10 percent positive torquing and a negative pulse of at least about 10 percent negative torquing;
   a maximum positive torquing pattern corresponding to a maximum error signal which comprises a square wave having a positive pulse of at least 90 percent positive torquing and a negative pulse of about 10 percent negative torquing;
   a maximum negative torquing pattern corresponding to a maximum positive error signal which comprises a square wave having a positive pulse of at least about 10 percent positive torquing and a
   a maximum negative pulse of about 90 percent negative torquing;
   an array of torquing patterns ranging between the null torquing pattern and the maximum positive torquing pattern wherein the negative pulses are about 10 percent negative torquing and the positive pulses are incremented in one microsecond steps up to a maximum of 230; and
   an array of torquing patterns ranging between the null torquing pattern and the maximum negative torquing pattern wherein the positive pulses are about 10 percent positive torquing and the negative pulses are incremented in one microsecond steps up to a maximum of 230.

5. The system of claim 4 wherein the torquing cycle is a period of about one 4115 Hz cycle.

6. The method of digitally rebalancing an inertial reference sensor having an analog error signal output, and further having a torquer coil wherein the rebalance circuit associates the error signal output with a stored sample value of an error signal and its corresponding rebalancing torquing pattern data stores torquing pattern data in a buffer, and subsequently generates a rebalancing waveform to rebalance the inertial reference sensor which comprises:

storing sample values of error signals and corresponding rebalancing torquing pattern data;
   integrating the error signal from the sensor;
   shaping the error signal;
   converting the error signal into a digital error signal;
   processing digital error signals including matching the digital error signal of the current torquing cycle with a stored sample value of an error signal and its corresponding rebalancing torquing pattern data;
   supplying the corresponding rebalancing torquing pattern data to the buffer;
   holding torquing pattern data in the buffer;
   generating rebalancing waveforms wherein the generated waveforms during a torquing cycle are derived from the corresponding rebalancing torquing pattern data associated with the digital error signal processed during the previous torquing cycle;
   decoding the generated waveforms into positive and negative torque control line currents;
   switching the positive and negative control line currents into the sensor torquer coil; and stabilizing the rebalance loop with passive compensation.

7. The method of claim 6 wherein the precision current switch is scaled for 20 g's maximum rebalance capability.

8. The method of claim 7 wherein the processing is accomplished within a microprocessor; a Read Only Memory circuit; and a Random Access Memory circuit.

9. The method of claim 8 wherein the rebalancing torquing pattern data comprises an array of rebalancing torquing patterns including:
- a null torquing pattern corresponding to null error signal which comprises a square wave having a positive pulse of about at least about 10 percent positive torquing and a negative pulse of about 10 percent negative torquing;
- a maximum positive torquing pattern corresponding to a maximum error signal which comprises a square wave having a positive pulse of at least 90 percent positive torquing and a negative pulse of about 10 percent negative torquing;
- a maximum negative torquing pattern corresponding to a maximum positive error signal which comprises a square wave having a positive pulse of at least about 10 percent positive torquing and a negative pulse of about 90 percent negative torquing;
- an array of torquing patterns ranging between the null torquing pattern and the maximum positive torquing pattern wherein the negative pulses are about 10 percent negative torquing and the positive pulses are incremented in one microsecond steps up to a maximum of 230; and
- an array of torquing patterns ranging between the null torquing pattern and the maximum negative torquing pattern wherein the positive pulses are about 10 percent positive torquing and the negative pulses are incremented in one microsecond steps up to a maximum of 230.

10. The method of claim 9 wherein the torquing cycle is a period of about one 4115 Hz cycle 11. A digital rebalance system for a gas damped accelerometer having an analog error signal output, and further having a torquer coil wherein the rebalance circuit associates the error signal output with a stored sample value of an error signal and its corresponding rebalancing torquing pattern data and subsequently generates a rebalancing waveform to rebalance the inertial reference sensor comprising:
- a Random Access Memory;
- a Read Only Memory connected to the Random Access Memory for storing software programs, sample values of error signals and corresponding rebalancing torquing pattern data;
- a first operational amplifier connected to a first set of resistors and capacitors connected in a pattern suitable for integrating and shaping the error signal from the accelerometer;
- means for converting the analog output of the first operational amplifier into a digital error signal, the conversion means being connected to the output of the first operational amplifier;
- a precision timing module including a buffer;
- a microprocessor connected to the Random Access and Read Only Memories including means for processing digital error signals connected to the buffer of the precision timing module and further including means for associating the digital error signal of the current torquing cycle with a stored sample value of an error signal and its corresponding rebalancing torquing pattern data, and further including a bus which transmits the corresponding rebalancing torquing pattern data to the buffer;
- a precision current switch connected to the torquer coil;
- steering logic connected between the input of the precision current switch and the output of the generating means for decoding the output of the generating means into positive and negative torque control lines for the precision current switch; and
- a second operational amplifier connected to a second set of passive components in a pattern suitable for providing passive compensation from the sensor error signal output to the torquer coil.

12. The system of claim 11 wherein the precision current switching means is scaled for 20 g's maximum rebalance capability.

13. The system of claim 12 wherein the rebalancing torquing pattern data comprises an array of rebalancing torquing patterns including:
- a null torquing pattern corresponding to null error signal which comprises a square wave having a positive pulse of about at least about 10 percent positive torquing and a negative pulse of about 10 percent negative torquing;
- a maximum positive torquing pattern corresponding to a maximum error signal which comprises a square wave having a positive pulse of at least 90 percent positive torquing and a negative pulse of about 10 percent negative torquing;
- a maximum negative torquing pattern corresponding to a maximum positive error signal which comprises a square wave having a positive pulse of at least about 10 percent positive torquing and a negative pulse of about 90 percent negative torquing;
- an array of torquing patterns ranging between the null torquing pattern and the maximum positive torquing pattern wherein the negative pulses are about 10 percent negative torquing and the positive pulses are incremented in one microsecond steps up to a maximum of 230; and
- an array of torquing patterns ranging between the null torquing pattern and the maximum negative torquing pattern wherein the positive pulses are about 10 percent positive torquing and the negative pulses are incremented in one microsecond steps up to a maximum of 230.

14. The system of claim 13 wherein the torquing cycle is a period of about one 4115 Hz cycle.

* * * * *